United States Patent [19]

Nakamura et al.

[11] Patent Number: 4,702,794
[45] Date of Patent: Oct. 27, 1987

[54] PRODUCTION OF THIN FILM MAGNETIC HEAD

[75] Inventors: Tsuneo Nakamura, Nara; Hidenori Yamasaki, Yamatokoriyama; Tohru Kira, Tenri; Mitsuhiko Yoshikawa, Ikoma, all of Japan

[73] Assignee: Sharp Kabushiki Kaisha, Osaka, Japan

[21] Appl. No.: 824,199

[22] Filed: Jan. 30, 1986

[30] Foreign Application Priority Data

Jan. 31, 1985 [JP] Japan .................................. 60-18879

[51] Int. Cl.$^4$ ............................................... B44C 1/22
[52] U.S. Cl. .................................... 156/643; 156/650; 156/653
[58] Field of Search ............... 156/643, 649, 650, 653, 156/659.1

[56] References Cited

U.S. PATENT DOCUMENTS 3,886,005 5/1975 Cota et al. ..................... 156/648 X

FOREIGN PATENT DOCUMENTS 0098626 6/1985 Japan ................................. 156/643

Primary Examiner—Arthur Kellogg
Attorney, Agent, or Firm—Birch, Stewart, Kolasch & Birch

[57] ABSTRACT

There is disclosed a process for modifying in an oxygen plasma an inert reaction product produced on a Fe-Al-Si alloy back core during a production of a thin film magnetic head utilizing a reactive ion etching (RIE) process. As a result of modifying the reaction product it is made readily soluble in and thus removable by water.

3 Claims, 9 Drawing Figures

PRODUCTION OF THIN FILM MAGNETIC HEAD

BACKGROUND OF THE INVENTION

The present invention relates to a process for preparing a thin film magnetic head used for high density recording.

A general construction of a conventional thin film magnetic head is illustrated according to FIG. 2. A magnetic core 1 is made from a ferromagnetic thin film, such as Ni-Fe alloy (Permalloy), Fe-Al-Si alloy (Sendust) and the like. The magnetic core is composed of a lower core 1a and an upper core 1b to form a magnetic circuit. An insulation layer 2 made from $SiO_2$, $Si_3N_4$ and the like, is provided on the surfaces of the lower core 1a and upper core 1b which electrically insulate the magnetic core 1 from a lead 3. The lead 3 is made from an electroconductive material, such as Cu, Al etc., a part of which is inserted between the upper 1b and lower 1a magnetic core. The upper core 1b and the lower core 1a are assembled face to face to form a gap A and are magnetically connected at a back core B. A recording medium 4, such as a magnetic tape or a magnetic disc, addresses the magnetic core adjacent the gap 4.

In this type of thin film magnetic head, an important feature relating to head efficiency is the magnetic contact condition of the upper core 1b and the lower core 1a at the back core B. It is required that the lower core 1a of the back core B have no substances on the surface thereof and have a minimal surface roughness. In case these rquirements are not sufficiently satisfied, the reluctance increases at the back core B and magnetic flux will hardly flow in the core 1, which reduces recording and reproduction efficiency.

The conventional method for forming the back core B has deficiencies regarding the requirements mentioned above. The back core B is generally formed by etching the insulation layer 2 by way of photolithography to selectively treat the surface of the lower core 1a. There has been proposed many etching processes such as wet etching by a hydrofluoric acid containing etchant and plasma etching by a fluorohydrocarbon gas, among which reactive ion etching (RIE) by the fluorohydrocarbon gas is preferred. Because the thin film magnetic heads comprise a high density, i.e. are multichanneled, microfabrication techniques are required. On the other hand, while there have been proposed many materials for the core, such as Permealloy, Sendust, an amorphous alloy such as CoZr and ferrite, Sendust is preferred because of its high saturation magnetization, magnetic properties stability against a heat factor and excellent corrosion resistance. Accordingly, in the process for preparing thin film magnetic heads, it is preferred that Sendust be used as the core material and that the RIE etching process be adopted in the fabrication process of the back core.

However, the above process also has the following problems:

(1) A brown reaction product is produced on the Sendust lower core after etching the insulation layer by the RIE process. This product prevents developement of a clean surface, and (2) This reaction product, which is chemically inert, is removed with difficulty, because it is insoluble in water; organic solvents, such as acetone, xylene, ethylene alcohol and the like; acids, such as hydrochloric acid, nitric acid or sulfuric acid; and alkalis, such as NaOH, KOH.

Thus, it is almost impossible for the reaction product formed on the surface of the RIE etched Sendust lower core 1a to be removed.

SUMMARY OF THE INVENTION

The present invention provides an improved process for removing the inert reaction product formed on a Sendust core material as a result of the RIE etching step.

Accordingly, the present invention provides a process for preparing a thin film magnetic head having an electroconductive coil and an insulation layer between a lower magnetic core made from Fe-Al-Si alloy and an upper magnetic core, comprising;

selectively etching the insulation layer from the surface of the lower core by a reactive ion etching (RIE) above or in a oxygen plasma to expose a part of the surface of the lower magnetic core, and allowing the etched article to stand in the oxygen plasma.

By "oxygen plasma" is meant a plasma of oxygen gas, a gas mixture of oxygen with argon or a gas mixture of oxygen with a fluorohydrocarbon gas.

DETAILED DESCRIPTION OF THE PRESENT INVENTION

When studying the reaction product produced on the surface of the lower magnetic core as a result of the RIE etching process, the following points are observed:

(i) The reaction product is only produced when the insulation layer on a Sendust core is etched by RIE, but is is not produced when the insulation layer on the other cores, such as Permalloy, is etched by the RIE method. In other words, it can be concluded that the reaction product is formed by a reaction of the components of Sendust, i.e. Fe, Al, Si, or a combination thereof, with a fluorine radical or another ion present in the fluorohydrocarbon gas plasma; and (ii) The reaction product only appears in the plasma of the fluorohydrocarbon gas. For example, the reaction product is not obtained if the Sendust layer is immersed in a mixture of hydrofluoric acid and ammonium fluoride.

Surprisingly, it has been found that the reaction product on the surface of the lower magnetic core can be modified to a water-soluble material when subjected to a plasma of oxygen, a mixture gas of oxygen with argon or a gas mixture of oxygen with a fluorohydrocarbon gas.

Figure 1A:
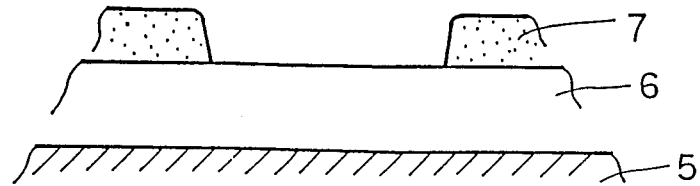
FIGS. 1(A) to 1(E) illustrate a proces for preparing the back core of the magnetic head of the present invention.
Figure 1B:
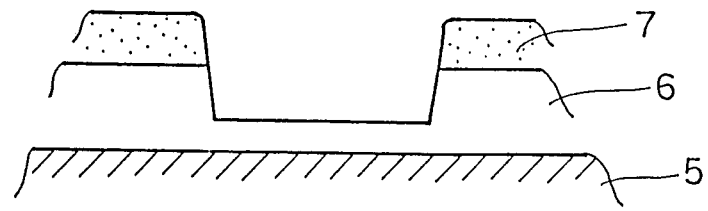
Figure 1C:
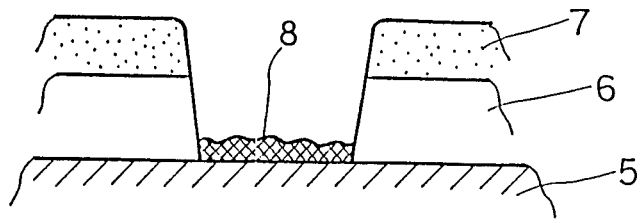
Figure 1D:
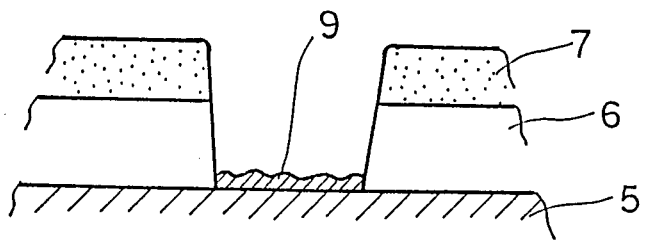
Figure 1E:
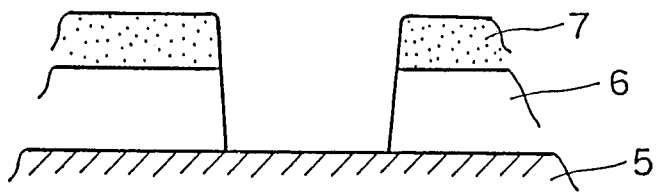
Figure 2:
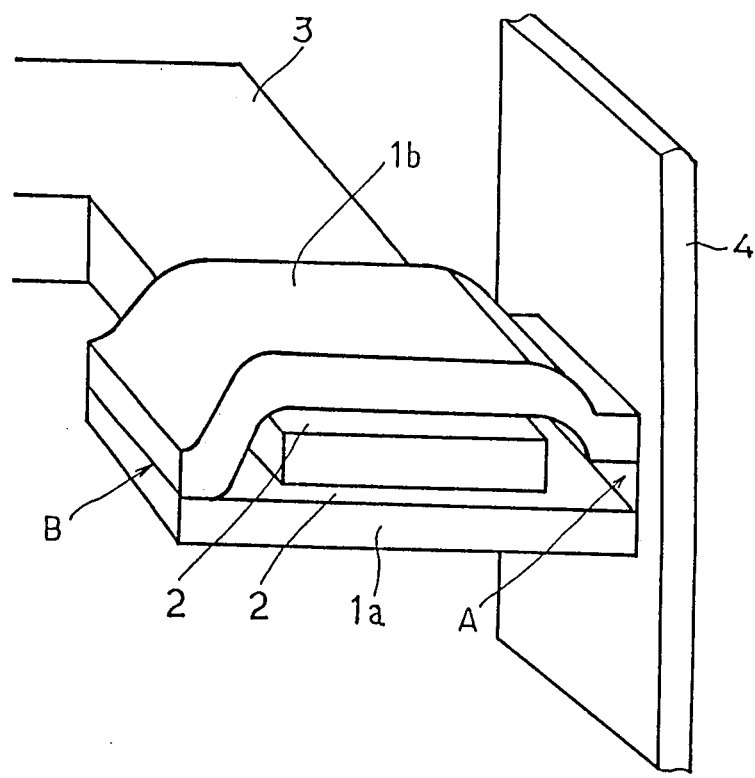
FIG. 2 is a sectional view showing a conventional construction of a thin film magnetic head.

The present invention is based on the process illustrated in FIGS. 1A-1C. A photoresist pattern 7 is formed on a $SiO_2$ layer 6 over Sendust layer 5 by means of photolithography, which is shown in FIG. 1(A). The $SiO_2$ layer is etched by the RIE method using a fluorohydrocarbon gas, such as $CF_4$, $CHF_3$ and the like, which is shown in FIG. 1(B). The etching is continued until the surface of the Sendust layer 5 is reached removing the insulation. On reaching the Sendust layer 5, a reaction product 8 appears on the Sendust surface, as is shown in FIG. 1(C). According to the present invention, the reaction product 8 is modified to a water-soluble compound 9 by introducing oxygen gas or a mixture gas of oxygen with argon, which is shown in FIG. 1(D). The water-soluble compound 9 is washed away to obtain a clean surface on the Sendust layer 5, as shown in FIG. 1(E).

The Sendust layer 5 is generally formed by vacuum evaporation or a sputtering process. The Sendust layer 5 is made from Fe, Al, and Si and the thickness of the layer 5 is within the range of from 4 to 6 μm. The photoresist used is available from Hoechst AG as AZ4110 and the like. The $SiO_2$ layer 6 is formed on the Sendust layer 5 by a sputtering or a plasma-CVD method to a thickness of from 3 to 4 μm. In this embodiment, the RIE etching method is carried out under conditions of a reaction gas ($CF_4$); gas pressure (0.03 Torr); power density (1.4 W/cm$^2$); and etching rate of the $SiO_2$ of 400 to 500 Å/min. In the modification of the reaction product 8 by means of the $O_2$ gas or $O_2$ gas mixture, the treatment is at a gas pressure of 0.03 Torr and the power density of 1.4 W/cm$^2$ for about 5 to 10 minutes.

A second embodiment of the present invention uses a gas mixture of oxygen with the fluorohydrocarbon gas. The reaction product 8 is only produced by a reaction of the fluorohydrocarbon gas with Sendust. In fact, if the RIE process is stopped during etching of the $SiO_2$ layer 6, the reaction product 8 is not found at all. In this embodiment, the etching gas is changed from the fluorohydrocarbon gas to a gas mixture of the fluorohydrocarbon gas ($CF_4$) with oxygen gas at a point when the remaining part of $SiO_2$ layer from 1,000 to 2,000 Å. Thus, the reaction product 8 is modified by the oxygen gas as soon as it is formed by the etching process. The condition of preparation generally is the same with the exception that the volume ratio of $CF_4$ to $O_2$ is 2:1 and the etching rate of $SiO_2$ is about 530 Å/minute.

Figure 3:
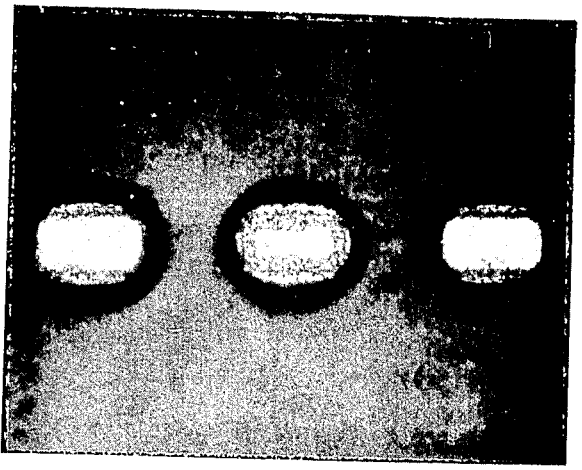
FIGS. 3(A) to 3(C) are microscopic photographs showing occurrence state of the reaction product on the surface of the back core.
Figure 3B:
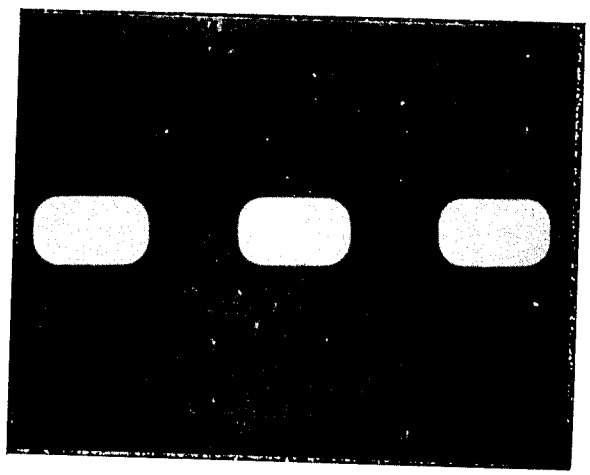
Figure 3C:
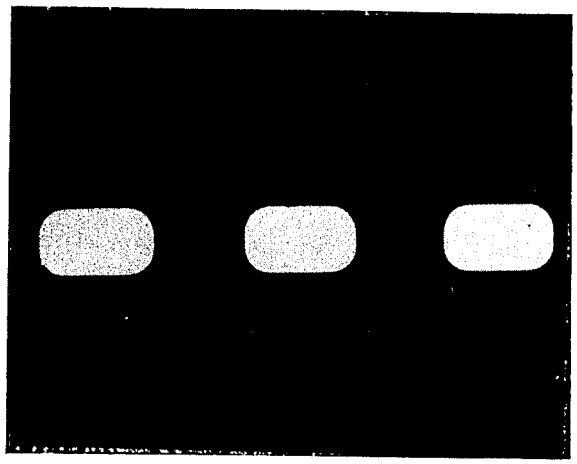

FIGS. 3(A) to 3(C) show microscopic photographs of the Sendust's surface at the back core portion. FIG. 3(A) shows a photograph of the brown reaction product produced on the Sendust's surface. This reaction product is recognized as scattered spots on the back core portion. FIG. 3(B) shows the first embodiment of the present invention in which, after etching the $SiO_2$ layer 6, the reaction product developed formed on the surface of the Sendust core is modified by using an oxygen gas or a mixture gas of oxygen gas with argon gas, and then washed away. The scattered spots on the Sendust's surface are completely removed as are shown in FIG. 3(B). FIG. 3(C) shows the second embodiment of the present invention, in which the reaction product is modified by the mixture gas of the fluorohydrocarbon gas ($CF_4$) and oxygen gas. The spots on the Sendust's surface are not observed.

According to the present invention, the reaction product on the Sendust's surface can be removed by a simple process without damage to the respective surface.

The invention being thus described, it will be obvious that the same may be varied in many ways. Such variations are not be be regarded as a departure from the spirit and scope of the present invention, and all such modifications as would be obvious to one skilled in the art are intended to be included within the scope of the following claims.

What is claimed is:

1. A method for preparing a back core of a thin film magnetic head used for high density recording inclusive of a magnetic core and an electroconductive coil, said magnetic core including an upper magnetic core and a lower magnetic core, said cores being assembled in a facial relationship providing a space therebetween for insertion therein of an electroconductive coil such that an inner surface of said upper core faces an inner surface of said lower core, each inner surface of said respective cores having an insulation layer coated thereon, said cores being magnetically connected at first ends thereof to form a back core, with second ends thereof forming a gap therebetween for addressing a magnetic tape or magnetic disc said method comprising:

providing a lower magnetic core material comprising a Fe-Al-Si alloy having coated on an inner surface thereof an insulation coating, selectively etching said coated inner surface at a first end of said lower magnetic core material, where a back core connection is to be formed with said upper core material, by a reactive ion etching (RIE) method utilizing a fluorohydrocarbon gas such that said insulation material is selectively removed down to said inner surface of said core material thereby forming a reaction product on said etched surface, allowing said etched core material to stand in a gas plasma selected from the group consisting of oxygen gas, a gas mixture of oxygen and argon and a mixture of oxygen with a fluorohydrocarbon gas thereby rendering said reaction product water soluble, and washing said etched surface of said lower magnetic core material with water so as to remove said reaction product.

2. The method of claim 1, wherein said reactive ion etching step utilizing fluorohydrocarbon gas proceeds in the presence of an oxygen plasma whereby said reaction product is instantaneously modified to a water soluble compound simultaneously as said reaction product forms on the surface of said core alloy.

3. The method of claim 2, wherein said oxygen plasma is introduced to said fluorohydrocarbon gas at a time when the thickness of a remaining portion of the insulation layer is from 1000 to 2000 angstroms.

* * * * *